US009786177B2

(12) United States Patent
Ayvaci et al.

(10) Patent No.: US 9,786,177 B2
(45) Date of Patent: Oct. 10, 2017

(54) PEDESTRIAN PATH PREDICTIONS

(71) Applicant: Honda Motor Co., Ltd., Tokyo (JP)

(72) Inventors: Alper Ayvaci, Santa Clara, CA (US); Vasiliy Igorevich Karasev, Los Angeles, CA (US); Bernd Heisele, Mountain View (CA); Yingying Zhu, Dublin, CA (US)

(73) Assignee: Honda Motor Co., Ltd., Tokyo (JP)

( * ) Notice: Subject to any disclaimer, the term of this patent is extended or adjusted under 35 U.S.C. 154(b) by 119 days.

(21) Appl. No.: 14/926,030

(22) Filed: Oct. 29, 2015

(65) Prior Publication Data

US 2016/0300485 A1    Oct. 13, 2016

Related U.S. Application Data

(60) Provisional application No. 62/145,848, filed on Apr. 10, 2015.

(51) Int. Cl.
*G08G 1/16* (2006.01)
*G06K 9/00* (2006.01)
(Continued)

(52) U.S. Cl.
CPC .......... *G08G 1/166* (2013.01); *G06K 9/00805* (2013.01); *B60G 9/02* (2013.01);
(Continued)

(58) Field of Classification Search
CPC .......... G08G 1/01; G08G 1/09; G08G 1/0116; G08G 1/0141; G08G 9/02; G08G 1/142; G08G 1/166; G08G 1/0129; G01S 3/786; G01S 3/7864; G06K 9/00; G06K 9/62; G06K 9/00342; G06K 9/00805;
(Continued)

(56) References Cited

U.S. PATENT DOCUMENTS 8,229,164 B2 * 7/2012 Miyamoto ................ B60R 1/00
382/103
8,860,564 B2 * 10/2014 Rubin ...................... G08G 9/02
340/435

(Continued)

FOREIGN PATENT DOCUMENTS

JP      11275562      10/1999
JP     2010102437      5/2010

*Primary Examiner* — Behrang Badii
(74) *Attorney, Agent, or Firm* — Rankin, Hill & Clark LLP

(57) ABSTRACT

Systems and techniques for pedestrian path predictions are disclosed herein. For example, an environment, features of the environment, and pedestrians within the environment may be identified. Models for the pedestrians may be generated based on features of the environment. A model may be indicative of goals of a corresponding pedestrian and predicted paths for the corresponding pedestrian. Pedestrian path predictions for the pedestrians may be determined based on corresponding predicted paths. A pedestrian path prediction may be indicative of a probability that the corresponding pedestrian will travel a corresponding predicted path. Pedestrian path predictions may be rendered for the predicted paths, such as using different colors or different display aspects, thereby enabling a driver of a vehicle to be presented with information indicative of where a pedestrian is likely to travel.

20 Claims, 7 Drawing Sheets

(51) Int. Cl.
  G08G 1/01    (2006.01)
  G06T 7/20    (2017.01)
  G08G 1/14    (2006.01)
  G08G 9/02    (2006.01)
  G01S 3/786   (2006.01)
  B60G 9/02    (2006.01)
  G06T 7/277   (2017.01)
  G08G 1/09    (2006.01)
  G06K 9/62    (2006.01)

(52) U.S. Cl.
  CPC ............. *G01S 3/786* (2013.01); *G01S 3/7864* (2013.01); *G06K 9/00* (2013.01); *G06K 9/00342* (2013.01); *G06K 9/00369* (2013.01); *G06K 9/62* (2013.01); *G06T 7/20* (2013.01); *G06T 7/277* (2017.01); *G08G 1/01* (2013.01); *G08G 1/0116* (2013.01); *G08G 1/0133* (2013.01); *G08G 1/09* (2013.01); *G08G 1/142* (2013.01); *G08G 9/02* (2013.01)

(58) Field of Classification Search
  CPC ........ G06K 9/00369; B60Q 1/00; B60Q 9/00; B60Q 9/008; B60Q 1/525; G06T 7/20; G06T 7/277; G06T 7/269; B60R 22/00; B60R 1/00; H04N 7/18; G06F 3/0346; G06F 3/0488; B60W 30/0956; B60W 40/08; G08B 21/06; G08B 25/01
  See application file for complete search history.

(56) References Cited

U.S. PATENT DOCUMENTS

| | | | |
|---|---|---|---|
| 2005/0278088 A1* | 12/2005 | Thorner | B60Q 9/005 701/28 |
| 2009/0024357 A1 | 1/2009 | Aso et al. | |
| 2009/0252380 A1 | 10/2009 | Shimizu | |
| 2010/0002908 A1* | 1/2010 | Miyamoto | B60R 1/00 382/103 |
| 2010/0305858 A1* | 12/2010 | Richardson | G06K 9/00785 701/301 |
| 2011/0313664 A1 | 12/2011 | Sakai et al. | |
| 2013/0278442 A1* | 10/2013 | Rubin | G08G 9/02 340/905 |
| 2014/0062685 A1 | 3/2014 | Tamatsu et al. | |
| 2014/0112538 A1 | 4/2014 | Ogawa et al. | |
| 2014/0219505 A1 | 8/2014 | Kindo et al. | |
| 2015/0035685 A1 | 2/2015 | Strickland et al. | |
| 2015/0206001 A1* | 7/2015 | Maurer | G06K 9/00342 382/103 |
| 2015/0338497 A1* | 11/2015 | Kwon | G06T 7/277 348/169 |
| 2017/0011625 A1* | 1/2017 | Stelzig | G08G 1/0116 |

* cited by examiner

PEDESTRIAN PATH PREDICTIONS

CROSS-REFERENCE TO RELATED APPLICATIONS

This application claims the benefit of U.S. Provisional Patent Application Ser. No. 62/145,848 entitled "PEDESTRIAN PREDICTIONS WITHIN A VEHICLE", filed on Apr. 10, 2015; the entirety of the above-noted application is incorporated by reference herein.

BACKGROUND

Predicting where a pedestrian will be going can be very difficult. For example, a prediction based only on a current trajectory of a pedestrian may not be sufficient. Furthermore, if a pedestrian has stopped, it is often difficult to determine when or whether the pedestrian will continue walking.

BRIEF DESCRIPTION

According to one or more aspects, a system for pedestrian path predictions may include a sensor component, a modeling component, a prediction component, and an interface component. The sensor component may identify an environment, one or more features of the environment, and one or more pedestrians within the environment. The modeling component may generate one or more models for one or more of the pedestrians based on one or more features of the environment. A model of one or more of the models may be indicative of one or more goals of a corresponding pedestrian and one or more predicted paths for the corresponding pedestrian. The prediction component may determine one or more pedestrian path predictions for one or more of the pedestrians based on one or more corresponding predicted paths. A pedestrian path prediction of one or more of the pedestrian path predictions may be indicative of a probability that the corresponding pedestrian will travel a corresponding predicted path. The interface component may render one or more of the pedestrian path predictions for one or more of the predicted paths.

In one or more embodiments, the sensor component may gather one or more observations from one or more of the pedestrians. The modeling component may infer one or more of the goals for one or more of the models based on one or more of the observations. The modeling component may generate one or more models for one or more of the pedestrians based on a Markov Decision Process (MDP). The modeling component may generate one or more models for one or more of the pedestrians based on one or more pedestrian navigation preferences. The modeling component may generate one or more models for one or more of the pedestrians based on one or more traffic rules. The modeling component may generate one or more models for one or more of the pedestrians based on a status of a feature of one or more of the features of the environment.

The system may include a score component generating one or more risk scores associated with one or more of the pedestrians indicative of a risk a vehicle equipped with the system for pedestrian path predictions poses an associated pedestrian or vice versa. The interface component may render one or more of the risk scores (e.g., for a driver of a vehicle equipped with the system for pedestrian path predictions). The system may include a response component providing one or more operation actions based on one or more of the risk scores.

According to one or more aspects, a method for pedestrian path predictions may include identifying an environment, one or more features of the environment, and one or more pedestrians within the environment and generating one or more models for one or more of the pedestrians based on one or more features of the environment. A model of one or more of the models may be indicative of one or more goals of a corresponding pedestrian and one or more predicted paths for the corresponding pedestrian. The method may include determining one or more pedestrian path predictions for one or more of the pedestrians based on one or more corresponding predicted paths. A pedestrian path prediction of one or more of the pedestrian path predictions may be indicative of a probability that the corresponding pedestrian will travel a corresponding predicted path. The method may include rendering one or more of the pedestrian path predictions for one or more of the predicted paths.

The method may include gathering one or more observations from one or more of the pedestrians. The method may include inferring one or more of the goals for one or more of the models based on one or more of the observations. The method may include generating one or more models for one or more of the pedestrians based on a Markov Decision Process (MDP). The method may include generating one or more models for one or more of the pedestrians based on one or more pedestrian navigation preferences. The method may include generating one or more models for one or more of the pedestrians based on one or more traffic rules. The method may include generating one or more models for one or more of the pedestrians based on a status of a feature of one or more of the features of the environment. The method may include generating one or more risk scores associated with one or more of the pedestrians indicative of a risk a vehicle equipped with the system for pedestrian path predictions poses an associated pedestrian or vice versa. The method may include rendering one or more of the risk scores.

According to one or more aspects, a system for pedestrian path predictions may include a sensor component, a modeling component, a prediction component, and an interface component. The sensor component may identify an environment, one or more features of the environment, and one or more pedestrians within the environment. The modeling component may generate one or more models for one or more of the pedestrians based on a Markov Decision Process (MDP). A model of one or more of the models may be indicative of one or more goals of a corresponding pedestrian and one or more predicted paths for the corresponding pedestrian. The prediction component may determine one or more pedestrian path predictions for one or more of the pedestrians based on one or more corresponding predicted paths. A pedestrian path prediction of one or more of the pedestrian path predictions may be indicative of a probability that the corresponding pedestrian will travel a corresponding predicted path. The interface component may render one or more of the pedestrian path predictions for one or more of the predicted paths.

DETAILED DESCRIPTION

Figure 1:
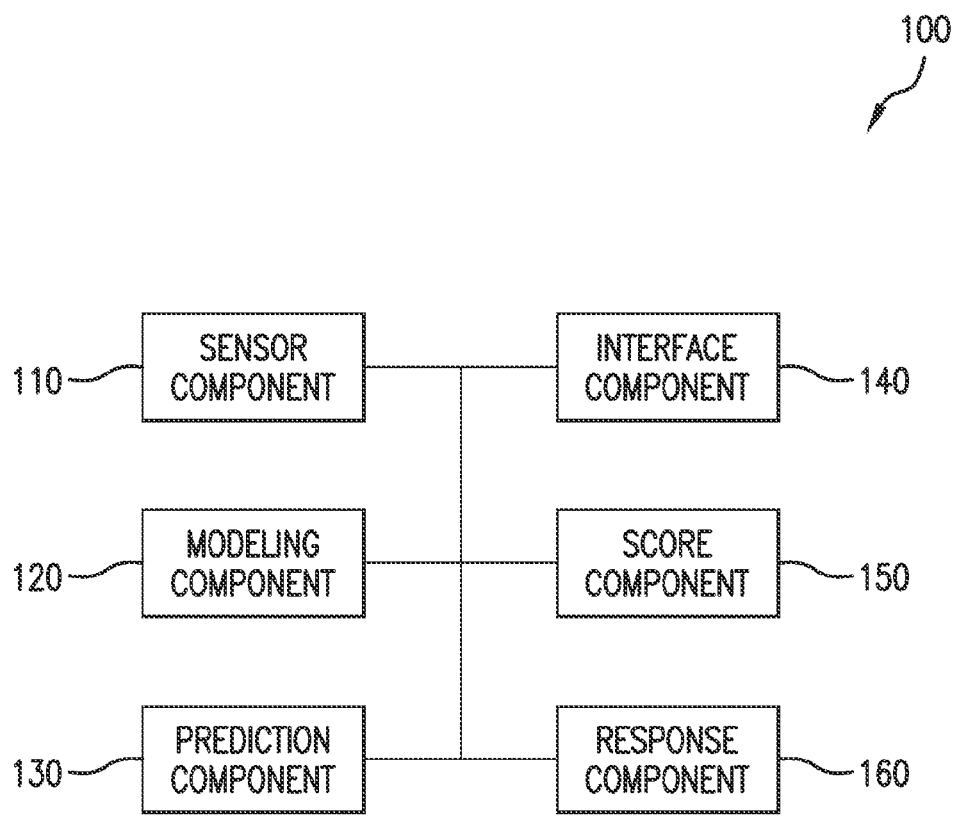
FIG. 1 is an illustration of an example component diagram of a system for pedestrian path predictions, according to one or more embodiments.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings. Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

The following terms are used throughout the disclosure, the definitions of which are provided herein to assist in understanding one or more aspects of the disclosure.

As used herein, pedestrians may include cyclists, individuals on roller skates, rollerblades, wheelchairs, individuals, or people in general, etc.

As used herein, the environment may include an operating environment, a physical environment, a real world environment, etc. Features of an environment may include markings, tangible features, intangible features, colors, textures, objects, obstacles, a status of an object, etc.

As used here, pedestrian path predictions may include one or more predicted paths for a pedestrian and one or more likelihoods or one or more probabilities that the pedestrian will take for respective predicted paths.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

FIG. 1 is an illustration of an example component diagram of a system 100 for pedestrian path predictions, according to one or more embodiments. A system 100 for pedestrian path predictions may include a sensor component 110, a modeling component 120, a prediction component 130, an interface component 140, a score component 150, and a response component 160.

A vehicle may be equipped with a system 100 for pedestrian path predictions. In one or more embodiments, a system 100 for pedestrian path predictions may generate one or more predictions with regard to where a pedestrian will be at a future time, such as ten to fifteen seconds from a current time. The system 100 for pedestrian path predictions may generate pedestrian path predictions by building models associated with corresponding pedestrians. The system 100 for pedestrian path predictions may utilize non-linear prediction, unlike other predictive algorithms. In one or more embodiments, the system 100 for pedestrian path predictions may take structures, features, or elements of an operating environment or a real world environment into account when generating one or more predictions for one or more corresponding pedestrians. Structures, features, or elements may include sidewalks, light posts, obstructions, trash cans, lane markings, traffic level, etc. Additionally, risk assessments and risk scoring for one or more obstacles or pedestrians may be provided.

The sensor component 110 may identify an environment, one or more features of an environment, one or more pedestrians within the environment, etc. Once identified, the sensor component 110 may track one or more of the pedestrians. For example, the sensor component 110 may record one or more observations regarding one or more of the pedestrians in a continuous manner, such as a direction the pedestrian is walking or travelling, a velocity associated with the pedestrian, a direction or an angle at which the pedestrian is looking (e.g., relative to a vehicle equipped with a system 100 for pedestrian path predictions).

The sensor component 110 may include an image capture unit, a radar unit, a LiDAR unit, a motion sensor unit, etc. Regardless, the sensor component 110 may gather or record one or more observations regarding one or more of the pedestrians within the environment or one or more of the features of the environment, such as a status of a feature of the environment.

The modeling component 120 may build or generate one or more models associated with one or more pedestrians. These models may be dynamic models. A model may represent one or more (e.g., different) predicted paths for an associated or corresponding pedestrian. A model may be generated based on one or more inferred goals of a pedestrian.

In one or more embodiments, the modeling component 120 may infer one or more goals for one or more of the pedestrians. A goal may be indicative of a location or destination a pedestrian desires to reach, the object of the pedestrian's effort, an aim or a desired result for the pedestrian, an intent of a pedestrian, etc.

As an example, the modeling component 120 may infer a goal of a pedestrian based on one or more observations associated with that pedestrian. Examples of observations (e.g., which may be gathered by the sensor component 110)

may include an observed trajectory determined from one or more movements or motions made by the pedestrian.

Goals may be continuously inferred or recalculated as the pedestrian moves or travels through the environment. In other words, goal may not necessarily be static in that a pedestrian may change his or her mind or in that a pedestrian may not necessarily travel in a straight line towards his or her goal. Accordingly, the sensor component 110 may make one or more observations regarding one or more of the pedestrians or continuously track one or more of the pedestrians to enable the modeling component 120 to update or recalculate goals for a pedestrian.

In any event, a model may be generated (e.g., by the modeling component 120) based on one or more of the goals or inferred goals of one or more of the pedestrians. Goals or inferred goals may be represented as a goal variable. In one or more embodiments, navigation towards a goal may be formulated as a Markov Decision Process (MDP).

Thus, the modeling component 120 may model or infer one or more of the goals for a pedestrian based on a MDP, and determine one or more predicted paths from the pedestrian to a goal. For example, predicted paths may be generated based on a shortest distance between the pedestrian and the goal and one or more pedestrian navigation preferences, discussed herein.

The model may also be generated based on a pedestrian state, which may be a function of (location, goal, velocity) of a pedestrian. A "move direction" may be specified by a Markov decision process (MDP) policy. A "move length" may be estimated or tracked by the sensor component 110.

In one or more embodiments, the modeling component 120 may estimate or infer a field of view for one or more of the pedestrians. For example, because the sensor component 110 may observe a direction in which a pedestrian is looking, the modeling component 120 may generate a model which is indicative of an inferred field of view or vision field for the corresponding pedestrian. In this way, the modeling component 120 may generate a model which is indicative of an amount of attention a pedestrian has towards an object, such as a vehicle or in a general direction.

In one or more embodiments, the modeling component 120 may generate a model for an associated pedestrian based on one or more pedestrian navigation preferences. Pedestrian navigation preferences may include an order of navigation preferences by which a pedestrian may prefer to travel. As an example, a pedestrian may prefer a sidewalk over a crosswalk over a path over the roadway or a road segment over obstacles, such as buildings. Thus, pedestrian navigation preferences may model how a pedestrian will react across different terrain types. In this way, the modeling component 120 may generate a model which is indicative of an intent of a pedestrian or travel preferences of a pedestrian because pedestrians generally do not stray from the sidewalk and may follow one or more travel or navigation preferences.

In one or more embodiments, the modeling component 120 may generate a model for an associated pedestrian based on one or more features of the environment. For example, the sensor component 110 may observe or identify objects or obstacles within the environment, such as a trash can. Here, if the pedestrian is located between the trash can and a vehicle equipped with a system for pedestrian path predictions, the modeling component 120 may generate a model indicating a likelihood that the pedestrian may drift away from the trash can and towards the vehicle, for example. In other words, when a trash can, garbage can, etc. is detected via the sensor component 110, the modeling component 120 may generate a model where a predicted path of a pedestrian includes a lane of travel remote from the garbage can or farthest from the garbage can. This move, estimated lane change, estimated path, etc. may occur at a threshold distance from the garbage can.

As another example, when a pedestrian is heading toward a light post, the modeling component 120 may build a model for the pedestrian which includes a predicted path taking the pedestrian straight, then in a semi-circular path around the light post, and then straight again.

Examples of features of an environment may include sidewalks, paved areas, walkways, well traveled areas (e.g., patchy grass indicative of wear and tear), light posts, obstructions, trash cans, lane markings, traffic level, presence of crowds at a crosswalk, actions of other pedestrians in the crowd, buildings, roads, etc. For example, the modeling component 120 may infer a portion of a predicted path for a pedestrian based on a crowd standing at a crosswalk and lane markings for the crosswalk (e.g., that the pedestrian is going to cross with the crowd, at the same time as the crowd, based on a crosswalk signal or travel of the crowd).

In one or more embodiments, the modeling component 120 may generate a model for an associated pedestrian based on one or more traffic rules. For example, the sensor component 110 may observe a status of a feature of an environment, such as a crosswalk signal, which is indicative of one or more traffic rules. Here, if the crosswalk signal is red, the modeling component 120 may generate the model for the associated pedestrian indicating that the pedestrian is unlikely to cross an associated crosswalk.

Further, the modeling component 120 may have the sensor component 110 monitor the status of the crosswalk signal such that when the crosswalk signal turns green, that the pedestrian will continue walking or travelling at that time. Conversely, while the crosswalk signal is red and the pedestrian is at a corresponding crosswalk, the model built by the modeling component 120 may indicate that the pedestrian is likely to be stopped or otherwise predict that motion or travel onto a crosswalk is unlikely when the crosswalk is red or a no walking signal is rendered. Further, the modeling component 120 may infer travel or movement of a pedestrian before a crosswalk signal turns green or changes to a walk signal based on other cues, such as when a crowd generally starts to walk together, changing of a light to yellow, the absence of traffic, etc. This may be accounted for in the goal inference provided by the modeling component 120 in "intent recognition" (e.g., estimation of goals). Other examples of statuses which may be monitored by the sensor component 110 may include crosswalk signals, traffic signals, traffic lights, etc.

In this way, the modeling component 120 may build or generate a model for a pedestrian indicative of a timing of when a pedestrian will start, stop, begin, or cease travelling. Stated another way, the modeling component 120 may build or generate models which enable a driver of a vehicle to anticipate when a pedestrian will initiate or cease travel, change directions, pause, etc. Thus, the modeling component 120 may build or generate models for pedestrians which are not limited to pedestrian path predictions based only on a current trajectory of a pedestrian. For example, if a pedestrian is stopped, the model may be utilized to predict a path of the pedestrian (e.g., while models which are based on a current trajectory would not be able to do so).

The model may be generated based on non-linear predictions, unlike other predictive algorithms. Regardless, the modeling component 120 may generate a model for a corresponding pedestrian based on goals of the pedestrian, a field of view of the pedestrian, inferred pedestrian attention, one or more pedestrian navigation preferences, one or more traffic rules, structures, features, or elements of an operating environment, physical environment, or a real world environment, such as structures along an anticipated path for a pedestrian, etc.

Behavior of a pedestrian may be modeled by a discrete-time dynamical system:

$$\begin{cases} x_{t+1} = f(x_t, \omega_t) \\ y_t = h(x_t) + n_t \end{cases}$$

where
$x \in X$ is a pedestrian's state
$f$ is the state-transition map
$y$ is the observation of the state measured through $h$
$\omega_t$ is the process noise
$n_t$ is the measurement noise
Assuming the system described by $(f, h)$ is observable, $y_1, \ldots y_t$ may be used to construct state estimate $\hat{x}_t$, which may be used to predict future states by iteratively applying the state-transition map:

$$f(\hat{x}_t), f \circ f(\hat{x}_t), f \circ f \circ f(\hat{x}_t), \ldots \hat{x}_t+1, \hat{x}_t+1, \hat{x}_t+2$$

When a point estimate $\hat{x}_t$ is not sufficient, such as when the posterior $p(x_t|y_1, \ldots, y_t)$ is multi-modal, the modeling component may generate samples from $p(x_{t+k}|y_1, \ldots, y_t)$ for $k=1, 2, \ldots$ and use those samples for prediction.

In one or more embodiments, the modeling component 120 may use the following model, abstracted into $\pi$. This model may have nonlinear, continuous, or discrete state components.

$$x_t = (x_t, v_t, g_t) \in X, \text{ where } X = \mathbb{R}^4 \times \{0, \ldots, N\}$$

System dynamics and measurements may be given by:

$$x_{t+1} = f(x_t, \omega_t) \Leftrightarrow \begin{cases} x_{t+1} = x_t + \|v_t\| \pi(x_t, g_t, \omega_{\pi,t}) \\ v_{t+1} = v_t + \omega_{v,t} \\ g_{t+1} = g_t \oplus \omega_{g,t} \end{cases}$$

$$y_t = h(x_t) + n_t \Leftrightarrow y_t = x_t + n_t$$

where $\omega_\pi$, $\omega_v$, and $\omega_g$ are components of process noise and $n$ is the measurement noise
where step direction is $\pi$
where step length is given by the norm of the current velocity estimate
where the goal variable may change over time
where $\oplus$ represents discrete switches according to:

$$g_{t+1} | g_t = \begin{cases} g_t & w \cdot p \cdot 1 - w_g \\ \text{Uniform}(0, \ldots, N) & w \cdot p \cdot w_g \end{cases}$$

The recursive state-estimation equations may be $$p(x_t | y^t) = \frac{1}{Z} p(y_t | x_t) \sum_{x_{t-1}} p(x_t | x_{t-1}) p(x_{t-1} | y^{t-1})$$

$$= \frac{1}{Z} p(y_t | x_t, v_t, g_t)$$

$$\sum_{x_{t-1}, v_{t-1}, g_{t-1}} p(x_t, v_t, g_t | x_{t-1}, v_{t-1}, g_{t-1})$$

$$p(x_{t-1}, v_{t-1}, g_{t-1} | y^t)$$

where $x_t \doteq (x_1, \ldots, x_t)$
The likelihood may be simplified to $$p(y_t | x_t, v_t, g_t) = p(y_t | x_t) = \mathcal{N}(y_t; x_t, \Sigma_n)$$

The transition distribution may be factorized as:

$$p(x_t, v_t, g_t | x_{t-1}, v_{t-1}, g_{t-1}) = p(g_t | g_{t-1}, x_{t-1}, v_{t-1})$$

$$p(x_t | x_{t-1}, v_{t-1}, g_{t-1}, g_t) p(v_t | x_t, g_t, x_{t-1}, v_{t-1}, g_{t-1}) =$$

$$p(g_t | g_{t-1}) p(x_t | x_{t-1}, v_{t-1}, g_{t-1}) p(v_t | v_{t-1})$$

The posterior may be factorized as:

$$p(x_t, v_t, g_t | y^t) = p(x_t, v_t | y^t) p(g_t | y^t, x_t, v_t)$$

The state estimation may be:

$$p(x_t, v_t | y^t) p(g_t | y^t, x_t, v_t) =$$

$$\frac{1}{Z} \mathcal{N}(y_t; x_t, \Sigma_n) \sum_{x_{t-1}, v_{t-1}, g_{t-1}} \begin{array}{l} p(g_t | g_{t-1}) p(x_t | x_{t-1}, v_{t-1}, g_{t-1}) p(v_t | v_{t-1}) \\ p(x_{t-1}, v_{t-1} | y^{t-1}) p(g_{t-1} | y^{t-1}, x_{t-1}, v_{t-1}) \end{array}$$

To approximately perform the marginalization, the mean of the distribution is used:

$$p(x_{t-1}, v_{t-1} | y^{t-1}), \text{ denoted by } \hat{x}_{t-1}, \hat{v}_{t-1}$$

Resulting in:

$$p(x_t, v_t | y^t) p(g_t | y^t, x_t, v_t) \approx$$

$$\frac{1}{Z} \mathcal{N}(y_t; x_t, \Sigma_n) \mathcal{N}(v_t; \hat{v}_{t-1}, \Sigma_v) p(\hat{x}_{t-1}, \hat{v}_{t-1} | y^{t-1})$$

$$\sum_{g_{t-1}} p(g_t | g_{t-1}) p(x_t | \hat{x}_{t-1}, \hat{v}_{t-1}, g_{t-1}) p(g_{t-1} | y^{t-1}, \hat{x}_{t-1}, \hat{v}_{t-1})$$

where $p(v_t | \hat{v}_{t-1}) = \mathcal{N}(v_t; \hat{v}_{t-1}, \Sigma_v)$ $$p(g_t | g_{t-1}) = \begin{cases} 1 - w_g & \text{if } g_t = g_{t-1} \\ w_g & \text{otherwise} \end{cases}$$

The following distribution may be indicative of how a pedestrian may move, given past location and velocity $(\hat{x}_{t-1}, \hat{v}_{t-1})$ and a previous goal $(g_{t-1})$:

$$p(x_t | \hat{x}_{t-1}, \hat{v}_{t-1}, g_{t-1}) =$$

$$\sum_w \mathcal{N}(x_t, \hat{x}_{t-1} + \|\hat{v}_{t-1}\| \pi(\hat{x}_{t-1}, g_{t-1}, w), \Sigma) p(w)$$

Further, this distribution may involve marginalizing over $w$—the stochastic component of $\pi$. This marginalization may be equivalent to taking into account and combining actions that a Markov decision process (MDP) policy $\pi$ assigns nonzero probabilities to at past location $\hat{x}_{t-1}$.

The prediction component 130 may analyze a model corresponding with a pedestrian and determine one or more likelihoods or one or more probabilities that the pedestrian will take for one or more of the predicted paths provided by the model for that pedestrian. These probabilities may be referred to as 'pedestrian path predictions' herein.

$X_{goals}$ may be a finite set of goals in state space

Each goal $g \in X_{goals}$ may be a region of X, such as a point

Thus, the modeling component 120 may generate a model based on the assumption that a pedestrian tends to navigate towards these goals, perhaps infrequently changing their goals. Further, the modeling component 120 may generate a model based on the assumption that the pedestrian's behavior or desire to reach a location in the environment is modeled as a solution to an optimal sequential decision problem or a Markov Decision Process (MDP).

In one or more embodiments:

---

$p(t_{t+\tau}|y^t)$ may be approximated by N samples $\{\tilde{x}_{t+\tau}^{(i)}\} i = 1, \ldots, N$
Algorithm 1 for sampling based approximation of $p(x_{t+\tau}|y^t)$
  Ensure: $\tilde{x}^i \sim p(x_{t+\tau}|y^t), i = 1, \ldots, N$
    for i = 1 to N do
      $\tilde{x}^{(i)} \sim p(x_t|y^t)$ (generate sample from posterior)
      for k = 0 to $\tau - 1$ do
        $\tilde{x}^{(i)} \sim p(x_{t+k+1}|\tilde{x}_{t+k}^{(i)})$ (propagate sample $\tau$ steps forward in time)
      end for
    end for

---

In one or more embodiments the previously discussed may be given for a model that generates samples from $p(x_{t+\tau}|y^t)$:

---

Algorithm 2 for sampling based approximation of $p(x_{t+\tau}|y^t)$(formal)
  Ensure: $\tilde{x}^{(i)} \sim p(x_{t+\tau}|y^t), i = 1, \ldots, N$
    for i = 1 to N do
      $(\tilde{x}_t^{(i)}, \tilde{v}_t^{(i)}) \sim p(x_t, v_t | y^t)$
      $g_t^{(i)} \sim p(g_t|y^t, \tilde{x}_t^{(i)}, \tilde{v}_t^{(i)})$
      for k = 0 to $\tau - 1$ do
        $\tilde{w}^{(i)} \sim p(w)$
        $\tilde{u}^{(i)} = \pi(\tilde{x}_t^{(i)}, \tilde{g}_t^{(i)}, \tilde{w}^{(i)})$ (generate sample direction from policy)
        $\tilde{x}_{t+1}^{(i)} \sim N(x_{t+1}; \tilde{x}_t^{(i)} + \|\tilde{v}_t^{(i)}\| \tilde{u}^{(i)}, \Sigma)$ (sample next location)
        $\tilde{v}_{t+1}^{(i)} \sim N(v_{t+1}; \tilde{v}_t^{(i)}, \Sigma_v)$ (sample next velocity)
        $\tilde{g}_{t+1}^{(i)} \sim p(g_{t+1}|\tilde{g}_t^{(i)})$ (sample next goal)
      end for
    end for

---

In one or more embodiments the previously discussed is repeated merely for the steps which are actually performed. In other words, resampling of velocity and goals may be omitted.

---

Algorithm 3 for sampling based approximation of $p(x_{t+\tau}|y^t)$(implemented)
  Ensure: $\tilde{x}^{(i)} \sim p(x_{t+\tau}|y^t), i = 1, \ldots, N$
    for i = 1 to N do
      $(\tilde{x}_t^{(i)}, \tilde{v}_t^{(i)}) \sim E(x_t, v_t | y^t)$
      $g_t^{(i)} \sim p(g_t|y^t)$
      for k = 0 to $\tau - 1$ do
        $\tilde{w}^{(i)} \sim p(w)$
        $\tilde{u}^{(i)} = \pi(\tilde{x}_t^{(i)}, \tilde{g}_t^{(i)}, \tilde{w}^{(i)})$ (generate sample direction from policy)
        $\tilde{x}_{t+1}^{(i)} \sim N(x_{t+1}; \tilde{x}_t^{(i)} + \|\tilde{v}_t^{(i)}\| \tilde{u}^{(i)}, \Sigma)$ (sample next location)
      end for
    end for

---

$p(x_{t+\tau}|y^t)$ may be approximated by N samples $\{\tilde{x}_{t+\tau}^{(i)}\} i = 1, \ldots, N$ The probability that a point x is occupied on an interval $\{t+1, \ldots, t+\tau\}$ may be approximated by sampling:

$$\mathbb{P}(x \text{ is occupied at } \{t+1, \ldots, t+\tau\}) \approx \frac{1}{N} \sum_{i=1}^{N} 1\{\tilde{x}_{t+1}^{(i)} = x\} \vee \ldots \vee 1\{\tilde{x}_{t+\tau}^{(i)} = x\}$$

A lattice $\mathbb{R}^2$ may be defined such that it has some small regions $z_{ij} \subset \mathbb{R}^2$ Additionally, the modeling component 120 may check whether a sampled trajectory falls into respective regions:

$$\mathbb{P}(z_{ij} \text{ is occupied at } \{t+1, \ldots, t+\tau\}) \approx \frac{1}{N} \sum_{i=1}^{N} 1\{\tilde{x}_{t+1}^{(i)} \in z_{ij}\} \vee \ldots \vee 1\{\tilde{x}_{t+\tau}^{(i)} \in z_{ij}\}$$

For a set of goals, the modeling component 120 may formulate a MDP with a reward:

$$R(x,u) = \|u\| \theta^T \phi(x)$$

where $\phi(x)$ returns a vector of terrain type probabilities
where $\theta$ is a vector of terrain type preferences
where u is the action in the MDP
Examples of terrain type may include sidewalk, road, crosswalk, path, grass, etc.
In the goal states $\{x \in g_i\}$, $R(x,u)=0$
When $\{x \notin g_i\}$, $R(x)<0$, and thus $x \in g_i$ are "absorbing states"
This ensures that an agent is continuously penalized until reaching a goal $g_i$.
Thus, the policy in this MDP leads an agent to $g_i$ as quickly as possible while respecting terrain preferences $\theta^T \phi(x)$, of the reward function. Accordingly, the MDP may define a stochastic shortest path to a goal $g_i$. The sensor component 110 may gather observations of trajectory of a pedestrian as evidence of a goal $g_i$ of a pedestrian.
Above, this was defined by $\pi(x, g, w) \in \mathbb{S}^1$, with $x \in \mathbb{R}^2$, $g \in \{0, \ldots, N\}$, and w as noise.
In one or more other embodiments:
$\pi(x,g)$ defines a probability distribution of a circle $\mathbb{S}^1$, given goal g and location x. Here, the distribution on a circle is used a stochastic move direction.

Because a pedestrian's behavior or goals may change depending on the environment or features of the environment, the modeling component 120 may build models accordingly. For example, some traffic signals display a countdown time (e.g., remaining time for a pedestrian to cross a crosswalk), thereby making the traffic signal observable via the sensor component 110. Even when no countdown timer is present, the modeling component 120 may model a state or status of a traffic signal or crosswalk signal as a stochastic system (e.g., despite the fact that it may be deterministic). In this model, $s \in \{$green, yellow, red$\}$ (e.g., the signal value).
In one or more embodiments, the dynamics of this model may be described by:

$$Pr(s_{t+1} | s_t = \text{green}) = \begin{cases} \text{green} & w \cdot p \cdot 1 - \frac{1}{|\tau_{green}|} \\ \text{yellow} & w \cdot p \cdot \frac{1}{|\tau_{green}|} \end{cases}$$

-continued $$Pr(s_{t+1} \mid s_t = \text{yellow}) = \begin{cases} \text{yellow } w \cdot p \cdot 1 - \dfrac{1}{|\tau_{yellow}|} \\ \text{red } w \cdot p \cdot \dfrac{1}{|\tau_{yellow}|} \end{cases}$$

$$Pr(s_{t+1} \mid s_t = \text{red}) = \begin{cases} \text{red } w \cdot p \cdot 1 - \dfrac{1}{|\tau_{red}|} \\ \text{green } w \cdot p \cdot \dfrac{1}{|\tau_{red}|} \end{cases}$$

In one or more other embodiments, the dynamics may be described by:

$$f(t) = \begin{cases} t+1 & \text{if } t \in \{1, \ldots, T_{max-1}\} \\ 1 & \text{if } t = T_{max} \end{cases}$$

$$h(t) = \begin{cases} \text{green} & \text{if } t \in T_{green} \\ \text{yellow} & \text{if } t \in T_{yellow} \\ \text{red} & \text{if } t \in T_{red} \end{cases}$$

The dynamics given by f is a periodic counter.
The measurement function given by h outputs the signal color at a time interval.
The intervals are a partition of $\{1, \ldots T_{max}\}$ (e.g., $T_{green} \cup T_{yellow} \cup T_{red} = \{1, \ldots, T_{max}\}$)
The modeling component 120 may generate models according to traffic rules.
Signal dynamics may be expressed as:

$$s_{t+1} = s_t \oplus w_{s,t}$$

$$x_{t+1} = f(x_t, w_t) \Leftrightarrow \begin{cases} x_{t+1} = x_t + \|v_t\| \pi(x_t, g_t, s_t, w_{\pi,t}) \\ v_{t+1} = v_t + w_{v,t} \\ g_{t+1} = g_t \oplus w_{g,t} \\ s_{t+1} = s_t \oplus w_{s,t} \end{cases}$$

$$y_t = h(x_t) + n_t \Leftrightarrow y_t = \begin{pmatrix} x_t + n_t \\ s_t \end{pmatrix}$$

Here, the MDP policy $\pi$ may be based on the tuple $x_t, g_t, s_t$. The reward of the MDP is modified to $R(x,s,u) = \|u\| \theta^T \phi(x,s)$ by assigning low values to crosswalk regions when s=red and by assigning higher values when s=green or s=yellow.

In one or more embodiments, the modeling component 120 may build models for pedestrians based on domain decomposition. Assuming that an agent's state space in a discretized location $$\left\{0, \ldots, \frac{n-1}{n}\right\}^2$$

and the environment includes M traffic lights. The augmented state space used to solve the optimal policy may be locally independent of coordinates of the state. In other words, pedestrian behavior may be independent of the state of faraway traffic signals. The modeling component 120 may construct a MDP in which state space is the state of an agent (e.g., pedestrian). This MDP may ignore dynamics of the environment. The modeling component 120 may construct a collection of other MDPs, each in a vicinity of a traffic signal. These other MDPs may represent state space of the state of the agent and the state of the local traffic signal (e.g., within the vicinity). Thus, the modeling component 120 may build models such that when a pedestrian or agent enters the vicinity of a traffic signal, the pedestrian behavior or predictions may be generated according to the optimal policy of a local MDP. Elsewhere, or outside of the vicinity, the pedestrian or agent behavior or predictions may be modeled according to a global MDP, ignoring the local environment dynamics.

The modeling component 120 may generate one or more models for a pedestrian based on a Markov Decision Process (MDP). An infinite horizon MDP is a tuple $M = (X, U, P, R, \gamma)$, where X is state space, U is the set of controls or actions, P describes state transition probabilities (e.g., its entries are $p(x_{t+1} | x_t, u_t)$), R is the reward function (e.g., dependent either on current state $R(x)$ or on state action pair, such as $R(x,u)$), and $\gamma \in [0,1)$ is a discount factor.

A policy may be a state-control mapping: $\pi: X \to U$. In the stochastic case, $u_t \sim \pi(u_t | x_t)$. An objective may be to find $\pi$ that maximizes the total discounted reward, after starting in state $x_0$:

$$V^\pi(x_0) = \sum_{t=0}^{\infty} \gamma^t \mathbb{E}[R(x_t, \pi(x_t))], \text{ where } x_{t+1} \sim p(x_{t+1} \mid x_t, \pi(x_t))$$

where V is a value function or the total discounted reward obtained by starting in $x_0$ and using $\pi$ thereafter. Here, the agent dynamics are stochastic. Further, the auxiliary function Q may be defined as:

$$Q^\pi(x,u) = R(x,u) + \gamma \mathbb{E}_{x' \sim x, u}[V^\pi(x')]$$

This function Q describes the value of performing action u in current state and continuing according to policy $\pi$ afterwards. For an optimal value function, at each x, $V^*(x) = \max_u Q(x, u)$; in general, $V^*(x) \geq Q(x, u)$, and the gap between the two can be used as a measure of "irrationality". Different algorithms may be used to compute $\pi$, such as a value iteration algorithm. In this way, MDPs are used as a formalization of stochastic shortest path problems.

Value iteration may iteratively apply a Bellman operator: $V(x) \leftarrow \max_u Q(x,u) \forall_x \in X$, which may be a fixed point iteration. The Bellman operator may be a contraction mapping and there may exist a unique fixed point corresponding to the optimal value function $V^*$.

The modeling component 120 may mitigate or avoid scenarios where an event is assigned a zero probability. Further, small deviations from optimality may be modeled using Boltzmann policies:

$$p(u|x) \propto \exp(-\alpha(V(x) - Q(x,u)))$$

As $\alpha \to \infty$, the policy assigns nonzero probability to optimal actions $$p(u|x) \propto 1\{u \in \arg\max_{\tilde{u}} Q(x, \tilde{u})\}$$

As $\alpha \to 0$, the policy becomes random $$p(u \mid x) = \frac{1}{|u|}$$

The modeling component 120 may utilize MDPs that are discrete. However, the sensor component 110 may observe pedestrians in $\mathbb{R}^2$ without discretization.

Let $\tilde{x}, \tilde{u}$ denote real valued variables and $x, u$ be discretized variables An observed pair of pedestrian states $\tilde{x}_t, \tilde{x}_{t+1}$ may be used to evaluate $p(\tilde{x}_{t+1} | \tilde{x}_t, g)$ from discretized quantities $(x_t, x_{t+1}, u_t)$:

$$p(\hat{x}_{t+1} | \hat{x}_t, g) = \sum_{\tilde{u}} p(\hat{x}_{t+1} | \hat{x}_t, \tilde{u}, g) p(\tilde{u} | \hat{x}_t, g)$$

transition matrix policy for g

Because $\hat{x}_t$ and $\hat{x}_{t+1}$ do not fall on the grid, the following approximation may be used:

$$p(x_{t+1} | x_t, g) = \sum_u \pi(x_{t+1} | x_t, u, g) Pr(u | x_t)$$

$$p(x_{t+1} | \hat{x}_t, g) = \sum_{x_t} p(x_{t+1} | x_t, g) p(x_t | \tilde{x}_t)$$

$$p(\hat{x}_{t+1} | \hat{x}_t, g) = \sum_{x_{t+1}} p(\hat{x}_{t+1} | x_{t+1}) p(x_{t+1} | \tilde{x}_t, g)$$

The sums $\Sigma x_t$ and $\Sigma x_{t+1}$ are over nearest neighbors of $\tilde{x}_t$ and $\tilde{x}_{t+1}$. Distributions which may be used include:

$$p(\tilde{x} | x) \propto \exp(-\alpha |\tilde{x} - x|); \text{ or}$$

$$p(x | \tilde{x}) \propto \exp(-\alpha |\tilde{x} - x|)$$

This reduces to nearest neighbor approximation with $\alpha \to \infty$.

The prediction component 130 may determine one or more of these probabilities based on one or more goals inferred by the modeling component 120, one or more features of the environment, states or statuses of respective features, pedestrian awareness, a direction the pedestrian is looking or facing, a historical path associated with the pedestrian, pedestrian history, pedestrian biometrics, pedestrian pose, etc. A pedestrian path prediction or a probability that a pedestrian will take a predicted path may change based on changes in the environment, such as when traffic increases, etc. In other words, a pedestrian may, at time t0 have a high probability of crossing a first crosswalk closest to him. However, as the pedestrian approaches the first crosswalk (e.g., at time t1), if traffic is congested, that pedestrian path prediction or probability that the pedestrian will use the first crosswalk may decrease (e.g., in favor of the pedestrian travelling straight and crossing at a second crosswalk farther away than the first crosswalk).

In this way, the prediction component 130 may provide one or more pedestrian path predictions, which may be made in continuous space. In other words, pedestrian path predictions or predicted paths may include one or more turn predictions (e.g., predicting whether a pedestrian is turning right or left). As an example, turn predictions may occur at an intersection or a crosswalk (although not necessarily at these locations). Regardless, these predicted paths or pedestrian path predictions may be generated for one or more pedestrians according to their surroundings or according to their environment and be indicative of whether it is anticipated that the pedestrian will travel left, right, forwards, backwards, stop, go, etc.

The prediction component 130 may generate one or more pedestrian path predictions or associated probabilities for a predicted path within a predetermined time window, such as ten or fifteen seconds from a current time.

The interface component 140 may render one or more views of a pedestrian, predicted paths, pedestrian path predictions, etc. using different views, such as a real world view, an overhead view, a birds-eye-view, etc. The interface component 140 may render these views side by side, individually, etc. on a display portion of the interface component 140. The display portion may be configured to render the views on at a time, concurrently, simultaneously, etc.

The interface component 140 may render one or more of the predicted paths for one or more of the pedestrians as well as the vehicle. In one or more embodiments, the interface component 140 may render pedestrian path predictions for the predicted paths in color. In other words, the interface component 140 may render one or more of the pedestrian path predictions or associated probabilities that a pedestrian will take a predicted path in different colors depending on the associated probability or likelihood that the pedestrian will take the predicted path. Stated another way, pedestrian path predictions may have one or more associated probabilities and be rendered in different colors, line thickness, or by varying other attributes used to illustrate one or more of the estimated paths based on likelihood of the pedestrian to take that predicted path. For example, if it is likely that a pedestrian will turn left, the predicted path turning left may be drawn with a thicker line, using brighter colors, blinking, flashing, etc. In this way, pedestrian path predictions rendered by the interface component 140 may include one or more turn predictions predicting whether a pedestrian will turn left or right.

The interface component 140 may render predictions for a time window, such as a ten second time window, which may incrementally loop (e.g., from time t0 to t10, from time t1 to t11, etc.). Regardless, predictions, pedestrian path predictions, etc. may include different paths, displayed or rendered in different colors, brightness, line thickness, frequencies of flashing or blinking, using different lengths, etc. depending on a likelihood or probability that the corresponding pedestrian will select that predicted path. Further, the interface component 140 may render a vision cone, an estimated field of view, a field of vision, etc. for a pedestrian (e.g., based on a direction in which the pedestrian is looking detected by the sensor component 110).

The interface component 140 may render one or more pedestrian path predictions or associated probabilities for a predicted path within a predetermined time window. The predicted paths or pedestrian path predictions may be rendered in an animated path, which includes a trail indicating a point of origin, an estimated travel path, and an estimated destination.

In one or more embodiments, the score component 150 may generate one or more risk scores or risk assessments associated with one or more of the pedestrians. A risk score may be a risk assessment indicative of a risk or threat the associated pedestrian may pose to the vehicle or vice versa. The score component 150 may generate one or more of the risk scores based on awareness of a pedestrian, a direction the pedestrian is facing, pose of a pedestrian, inferred pedestrian goals, etc. The interface component 140 may render a risk versus time graph or other rendering which includes a risk score for a pedestrian.

In one or more embodiments, the score component 150 may provide a framework for predicting potential collisions. Risk may be defined by a probability that a vehicle and a pedestrian are within $\in$ at time $\tau$:

$$R(\tau, \in) = \mathbb{P}(\|x_\tau^{ego} - x_\tau^{ped}\| \leq \in)$$

Risk may be calculated for a Dubins vehicle using a model for ego-vehicle dynamics:

$$x_{t+1} = f(x_t, \omega_t) \Leftrightarrow \begin{cases} x_{t+1} = x_t + v_t \begin{pmatrix} \cos\theta_t \\ \sin\theta_t \end{pmatrix} \\ v_{t+1} = v_t + \omega_{v,t} \\ \theta_{t+1} = \theta_t + v_t \omega_{\theta,t} \end{cases}$$

$$y_t = h(x_t) + n_t \Leftrightarrow y_t = \begin{pmatrix} x_t + n_{x,t} \\ \theta_t + n_{\theta_t} \end{pmatrix}$$

As a result, when a vehicle stops moving, the risk of collision decreases to zero.

If a collision is imminent or likely, as determined by the prediction component 130, the interface component 140 may render a notification or an alert for the driver of the vehicle. Further, the response component 160 may provide one or more operation actions, such as a braking action, a steering action, etc. to mitigate collision with a pedestrian (e.g., based on one or more of the risk scores).

Figure 2:
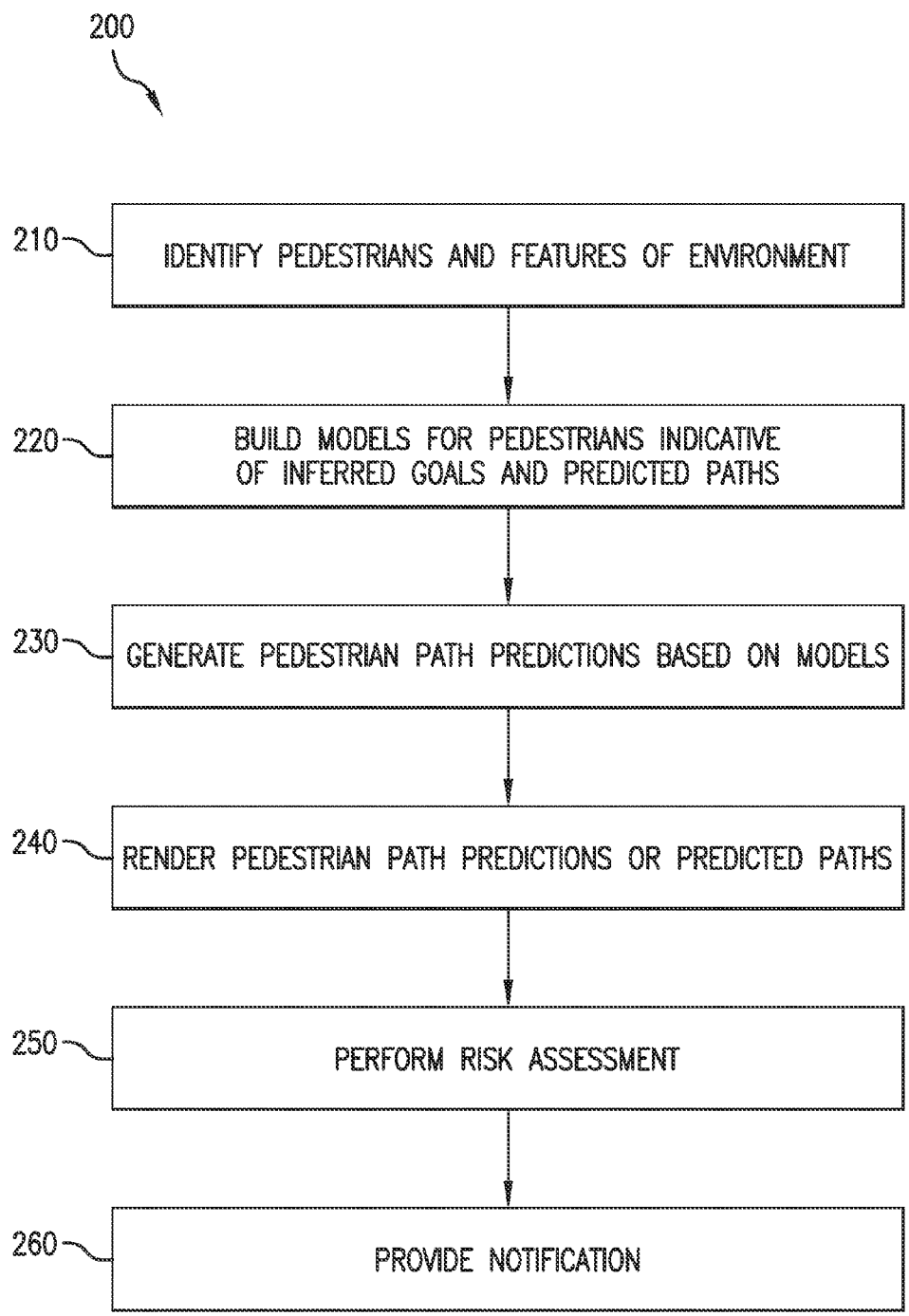
FIG. 2 is an illustration of an example flow diagram of a method for pedestrian path predictions, according to one or more embodiments.

FIG. 2 is an illustration of an example flow diagram of a method 200 for pedestrian path predictions, according to one or more embodiments. At 210, the environment, features of the environment, and pedestrians within the environment may be identified. At 220, models may be built for pedestrians which are indicative of goals and predicted paths for the pedestrians. At 230, pedestrian path predictions may be generated based on respective models. At 240, pedestrian path predictions or predicted paths may be rendered. At 250, risk assessments may be performed or determined for one or more of the pedestrians. At 260, one or more notifications may be rendered based on the risk assessments.

One or more of the following figures may be described with reference to one or more components of the system 100 for pedestrian path predictions of FIG. 1.

Figure 3:
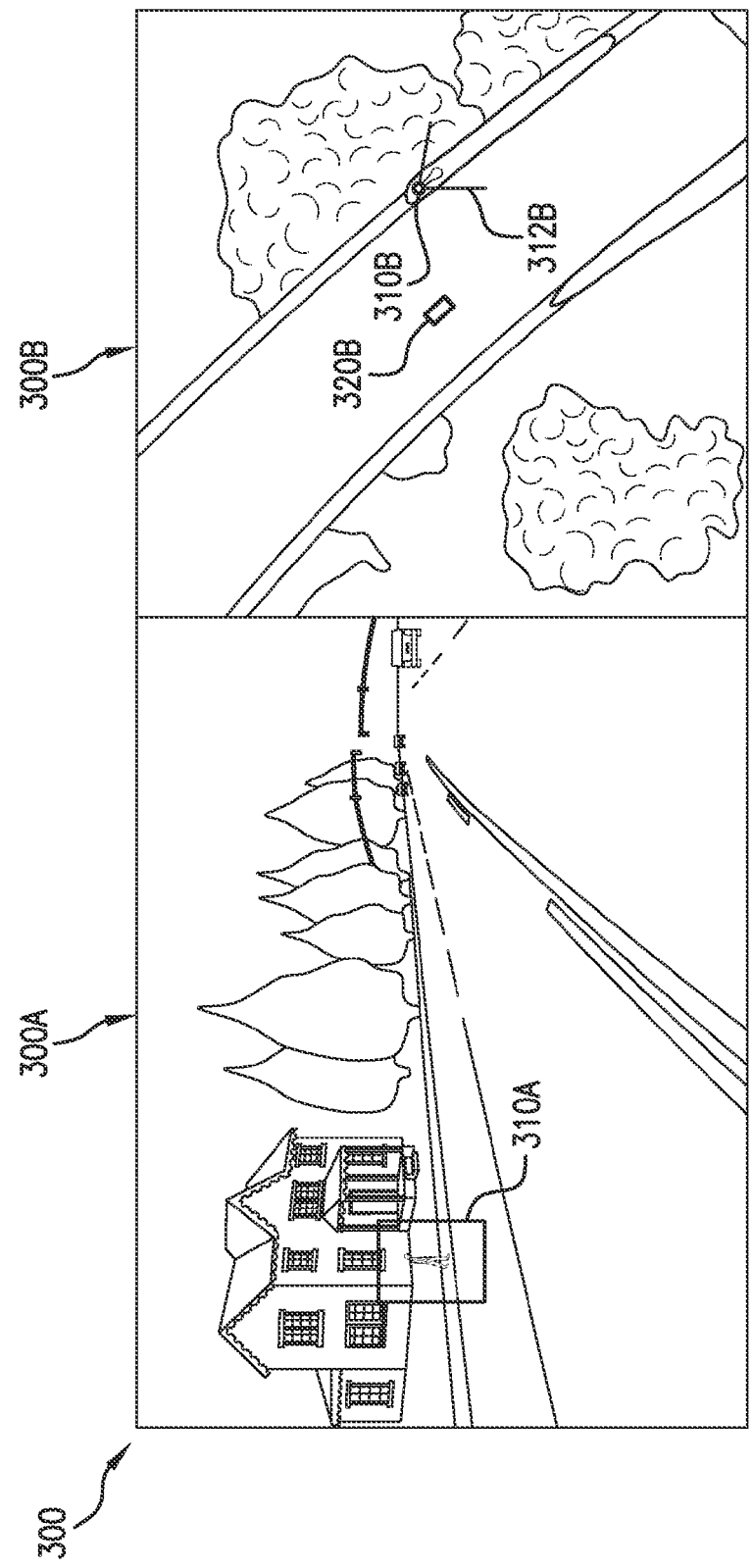
FIG. 3 is an illustration of an example rendering of a predicted path for a pedestrian generated by a system or method for pedestrian path predictions, according to one or more embodiments.

FIG. 3 is an illustration of an example rendering 300 of a predicted path for a pedestrian generated by a system or method for pedestrian path predictions, according to one or more embodiments. The interface component 140 may render a first view 300A and a second view 300B on a display portion. The first view 300A may be a first person view and the second view 300B may be a birds-eye-view. A pedestrian 310A, 310B is rendered in both views 300A and 300B. The vehicle is represented by 320B. The interface component 140 may render a vision cone 312B indicative of an estimated field of view for the pedestrian (e.g., based on where the pedestrian is looking, etc.).

Figure 4:
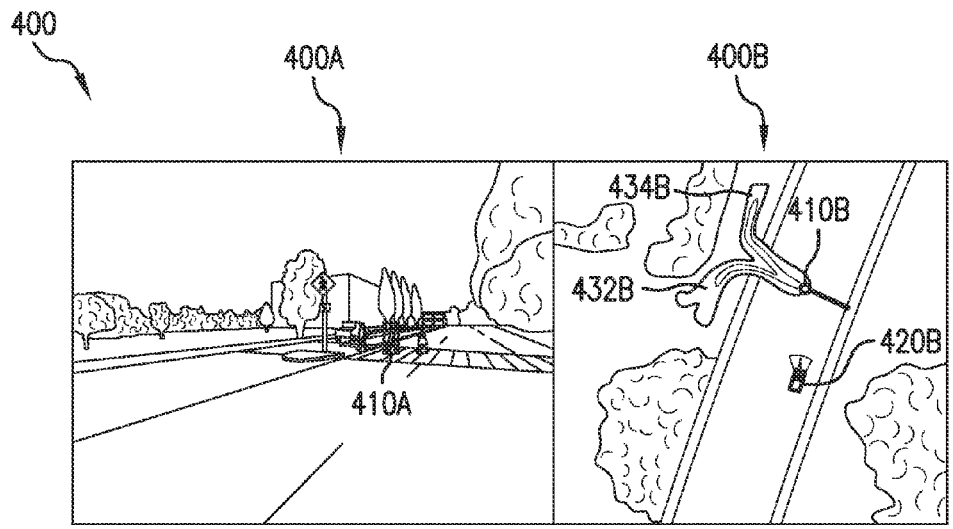
FIG. 4 is an illustration of an example rendering of multiple predicted paths for a pedestrian generated by a system or method for pedestrian path predictions, according to one or more embodiments.

FIG. 4 is an illustration of an example rendering 400 of multiple predicted paths for a pedestrian generated by a system or method for pedestrian path predictions, according to one or more embodiments. The interface component 140 may render a first view 400A and a second view 400B. A pedestrian 410A, 410B is rendered in both views 400A and 400B, while the vehicle is represented by 420B. Multiple pedestrian path predictions 432B, 434B and corresponding predicted paths may be rendered. Here, it appears that the pedestrian may turn left or right.

Figure 5:
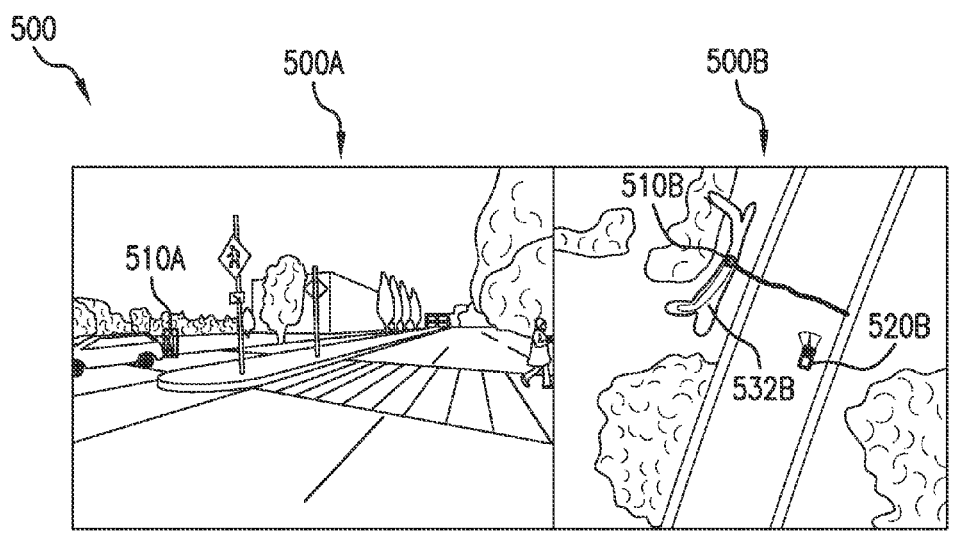
FIG. 5 is an illustration of an example rendering of multiple predicted paths for a pedestrian generated by a system or method for pedestrian path predictions, according to one or more embodiments.

FIG. 5 is an illustration of an example rendering 500 of multiple predicted paths for a pedestrian generated by a system or method for pedestrian path predictions, according to one or more embodiments. The interface component 140 may render a first view 500A and a second view 500B. A pedestrian 510A, 510B is rendered in both views 500A and 500B, while the vehicle is represented by 520B. Because more time has progressed from FIG. 4, a single pedestrian path prediction 532B is rendered, indicating a high probability that the pedestrian 510B will travel according to 532B.

Figure 6:
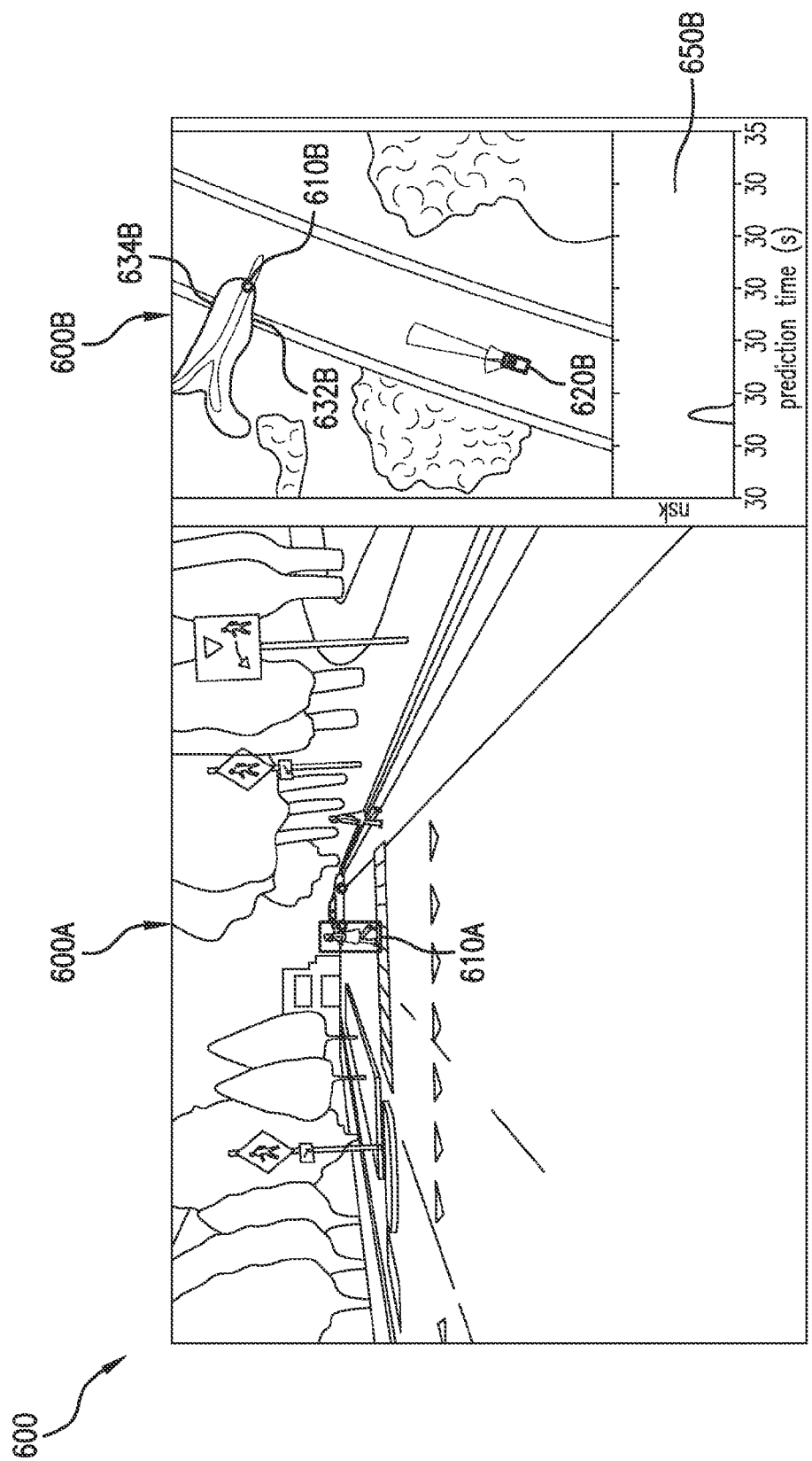
FIG. 6 is an illustration of an example rendering of multiple predicted paths for a pedestrian generated by a system or method for pedestrian path predictions, according to one or more embodiments.

FIG. 6 is an illustration of an example rendering 600 of multiple predicted paths for a pedestrian generated by a system or method for pedestrian path predictions, according to one or more embodiments. The interface component 140 may render a first view 600A and a second view 600B. A pedestrian 610A, 610B is rendered in both views 600A and 600B, while the vehicle is represented by 620B. Pedestrian path predictions 632B, 634B and corresponding predicted paths may be rendered. Additionally, a risk assessment 650B may be provided, indicating a likelihood of collision with the pedestrian 610B at a given time.

In one or more embodiments, a system 100 for pedestrian path predictions may utilize hierarchical code representations to manage an amount of processing being done or to mitigate the computational load on a processor or processing unit.

The modeling component may build a hierarchical map representation for planning and navigation, such as using a two-level hierarchy:

Let $X^{(1)}$ and $U^{(1)}$ denote a coarse state and control spaces (e.g., abstract spaces)

This pair may be viewed as a set of nodes and edges in a graph. With the coarse state space, a reward $R^{(1)}$ and a discount factor $Y^{(1)}$ may be associated. Because this MDP is deterministic, $P^{(1)}$ includes delta-distributions. Let $\{M^{(0)}\}_{ij}$ denote a set of low-level or base level MDPs. Each $M_{ij}^{(0)}$ describes a low-level task of moving from $i \in X^{(1)}$ to $j \in X^{(1)}$.

When $i=j, M_{ii}^{(0)}$ describes navigation to a specific low level state within $i \in X^{(1)}$.

Let the low level or original state space be denoted by $X^{(0)}$.

To each $i \in X^{(1)}$, there corresponds a subset of the original state space. In other words, there exists a "clustering function" $\psi: X^{(0)} \rightarrow X^{(1)}$. Planning from $x \in X^{(0)}$ to $g \in X^{(0)}$ may be achieved by the following:

Find corresponding coarse nodes: $i_{init} = \psi(x)$, $i_{goal} = \psi(g)$

Solve $M^{(1)}$ to obtain a policy $\pi^{(1)}$, which describes the shortest path to the node containing the goal state.

Let the optimal or shortest path be a sequence of nodes denoted by $(i_{init}, i_2, \ldots, i_n, i_{goal})$. Solve low level MDPs along the optimal path: MDPs $M_{i_{init},i_2}^{(0)}, M_{i_2,i_3}^{(0)}, \ldots, M_{i_n,i_{goal}}^{(0)}, M_{i_{goal},i_{goal}}^{(0)}$. The path from x to g may be followed using policies $\pi_{i_{init},i_2}^{(0)}, \pi_{i_2,i_3}^{(0)}, \ldots, \pi_{i_n,i_{goal}}^{(0)}, \pi_{i_{goal},i_{goal}}^{(0)}$.

The foregoing has the advantages of enabling a large fraction of state space to be ignored during planning, thereby resulting in computational savings. If there were multiple goals, such as N goals, N coarse MDPs may have been solved. This should be fast since $X^{(1)}$ is generally small. The low level MDPs may be used: if a pair $i,j \in X^{(1)}$ is used in the shortest path for multiple goals, each path may use the policy $\pi_{ij}^{(0)}$.

In one or more embodiments, a coarse reward $R^{(1)}$ may be constructed:

Given $R^{(0)}$ defined on an entire $X^{(0)}$, the coarse reward $R^{(1)}$ may be constructed where i and j are two coarse states in $X^{(1)}$ which are neighbors. In other words: $p(s^{(1)}=j|s^{(1)}=i, u^{(1)})>0$ for some $u^{(1)}$. The corresponding low level states are $s \in \psi^{-1}(i)$ and $s' \in \psi^{-1}(j)$. These two sets are non-intersecting. The set of points within $\psi^{-1}(i)$ that shares a boundary with $\psi^{-1}(j)$ is denoted by:

$$S_{ij} = \{x : x \in \psi^{-1}(i), y \in \psi^{-1}(j) \text{ and } p(y|x,u) > 0 \text{ for some } u\}.$$

Let $S=S_{ij} \cup S_{ji}$. In other words, the set of all points at the boundary.

The reward may be expressed as the average of low level rewards at the boundary:

$$R^{(1)}(i, j) = d(i, j)\left(\frac{1}{|S|}\sum_{s \in S} R^{(0)}(s)\right),$$

where d(i, j) is a type of distance between coarse states. As an example, when $X^{(0)} = \mathbb{R}^2$, d(i,j) may be used to be the $l_2$ norm between centers of $\psi^{-1}(i)$ and $\psi^{-1}(j)$.

For a coarse reward to be an accurate approximation of a low level reward, $R(\psi^{-1}(i))$ should be nearly flat. Spectral clustering may be used to obtain $X^{(1)}$. A k-means like clustering algorithm that combines location and environment category probabilities may be employed:

$$l(x) = \arg\min \|x - x_k\| + \lambda |\phi(x) - \phi_k|$$

$$(x_k, \phi_k) = \frac{1}{|\{x: l(x) = k\}|} \sum_{x: l(x)=k} (x, \phi(x))$$

One or more embodiments may employ various artificial intelligence (AI) based schemes for carrying out various aspects thereof. One or more aspects may be facilitated via an automatic classifier system or process. A classifier is a function that maps an input attribute vector, x=(x1, x2, x3, x4, xn), to a confidence that the input belongs to a class. In other words, f(x)=confidence (class). Such classification may employ a probabilistic or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that may be similar, but not necessarily identical to training data. Other directed and undirected model classification approaches (e.g., nave Bayes, Bayesian networks, decision trees, neural networks, fuzzy logic models, and probabilistic classification models) providing different patterns of independence may be employed. Classification, as used herein, may be inclusive of statistical regression utilized to develop models of priority.

One or more embodiments may employ classifiers that are explicitly trained (e.g., via a generic training data) as well as classifiers which are implicitly trained (e.g., via observing user behavior, receiving extrinsic information). For example, SVMs may be configured via a learning or training phase within a classifier constructor and feature selection module. Thus, a classifier may be used to automatically learn and perform a number of functions, including but not limited to determining according to a predetermined criteria.

Figure 7:
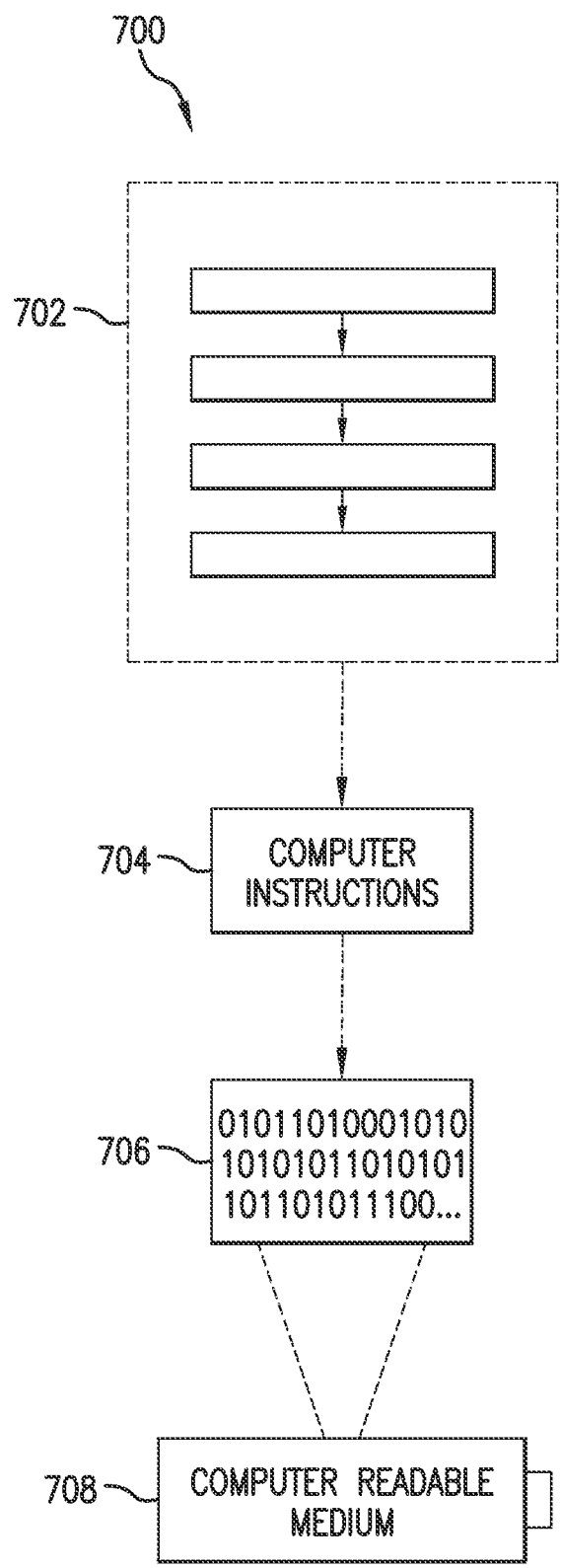
FIG. 7 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This computer-readable data 706, such as binary data including a plurality of zero's and one's as shown in 706, in turn includes a set of computer instructions 704 configured to operate according to one or more of the principles set forth herein. In one such embodiment 700, the processor-executable computer instructions 704 may be configured to perform a method 702, such as the method 200 of FIG. 2. In another embodiment, the processor-executable instructions 704 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components may reside within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
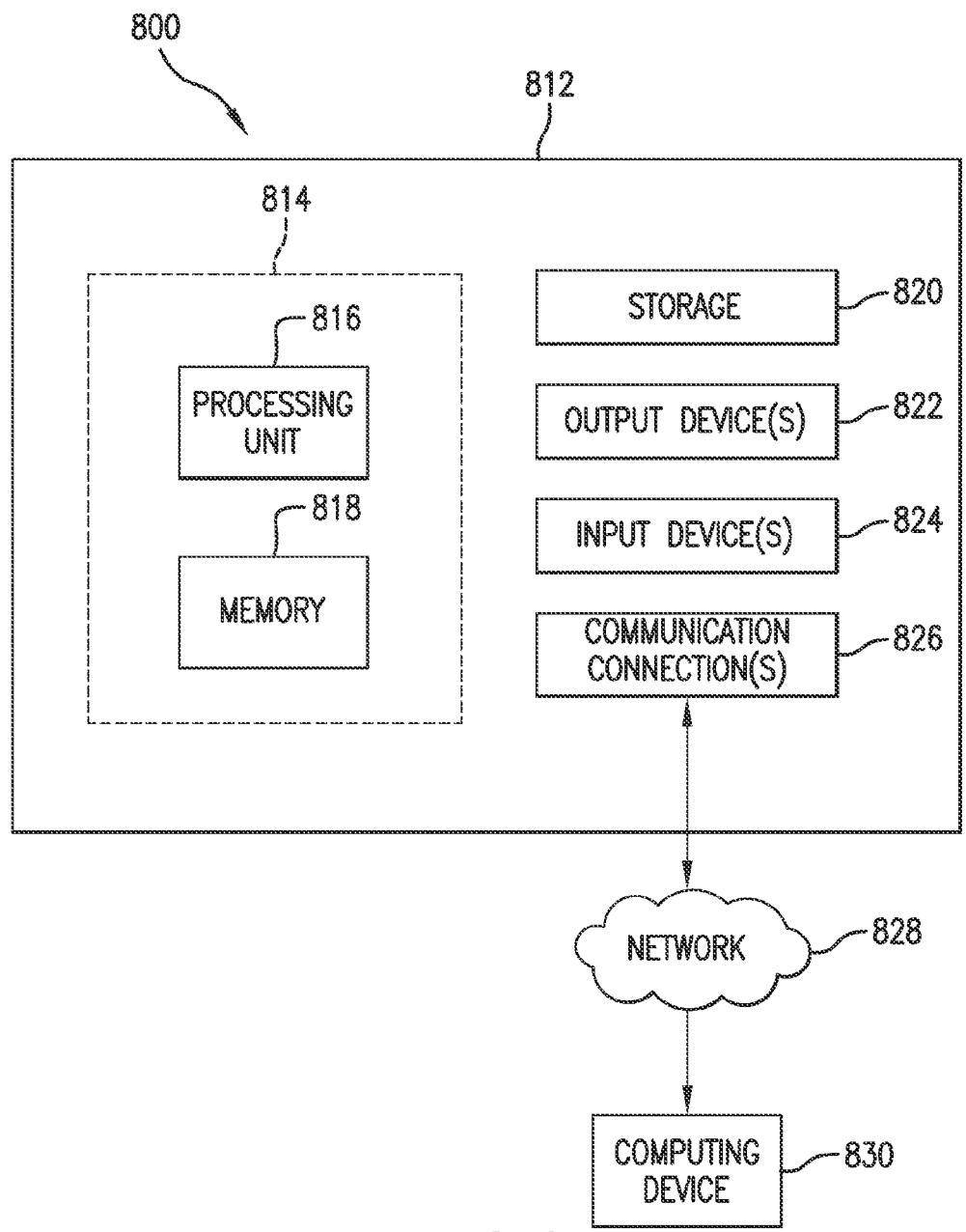
FIG. 8 is an illustration of an example computing environment where one or more of the provisions set forth herein are implemented, according to one or more embodiments.

FIG. 8 and the following discussion provide a description of a suitable computing environment to implement embodiments of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one or more embodiments provided herein. In one configuration, computing device 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other embodiments, device 812 includes additional features or functionality. For example, device 812 may include additional storage such as removable storage or non-removable storage, including, but not limited to, magnetic storage, optical storage, etc. Such additional storage is illustrated in FIG. 8 by storage 820. In one or more embodiments, computer readable instructions to implement one or more embodiments provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 812. Any such computer storage media is part of device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 812 includes input device(s) 824 such as keyboard, mouse, pen, voice input device, touch input device, infrared cameras, video input devices, or any other input device. Output device(s) 822 such as one or more displays, speakers, printers, or any other output device may be included with device 812. Input device(s) 824 and output device(s) 822 may be connected to device 812 via a wired connection, wireless connection, or any combination thereof. In one or more embodiments, an input device or an output device from another computing device may be used as input device(s) 824 or output device(s) 822 for computing device 812. Device 812 may include communication connection(s) 826 to facilitate communications with one or more other devices.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for pedestrian path predictions, comprising:
a sensor component identifying an environment, one or more features of the environment, and one or more pedestrians within the environment, wherein the sensor component observes one or more pedestrian states for the respective pedestrians;
a modeling component generating one or more models for one or more of the pedestrians based on one or more features of the environment, wherein a model of one or more of the models is indicative of one or more estimated goals of a corresponding pedestrian indicative of a desired destination for the corresponding pedestrian and one or more predicted paths for the corresponding pedestrian, wherein the model is generated based on one or more of the observed pedestrian states;
a prediction component determining two or more pedestrian path predictions for one or more of the pedestrians based on two or more corresponding predicted paths, wherein a pedestrian path prediction of one or more of the pedestrian path predictions is indicative of a probability that the corresponding pedestrian will travel a corresponding predicted path; and
an interface component rendering two or more of the pedestrian path predictions for two or more of the predicted paths, the rendering including a birds-eye-view of the environment, wherein each of the pedestrian path predictions is rendered to have a length associated with the probability that the corresponding pedestrian will travel on the corresponding predicted path, and wherein the interface component updates the rendering based on additional observed pedestrian states.

2. The system of claim 1, wherein the sensor component gathers one or more observations from one or more of the pedestrians.

3. The system of claim 2, wherein the modeling component infers one or more of the estimated goals for one or more of the models based on one or more of the observations.

4. The system of claim 1, wherein the modeling component generates one or more models for one or more of the pedestrians based on a Markov Decision Process (MDP).

5. The system of claim 1, wherein the modeling component generates one or more models for one or more of the pedestrians based on one or more pedestrian navigation preferences.

6. The system of claim 1, wherein the modeling component generates one or more models for one or more of the pedestrians based on one or more traffic rules.

7. The system of claim 1, wherein the modeling component generates one or more models for one or more of the pedestrians based on a status of a feature of one or more of the features of the environment.

8. The system of claim 1, comprising a score component generating one or more risk scores associated with one or more of the pedestrians indicative of a risk a vehicle equipped with the system for pedestrian path predictions poses an associated pedestrian or vice versa.

9. The system of claim 8, wherein the interface component renders one or more of the risk scores.

10. The system of claim 8, comprising a response component providing one or more operation actions based on one or more of the risk scores.

11. A method for pedestrian path predictions, comprising:
identifying an environment, one or more features of the environment, and one or more pedestrians within the environment;
observing one or more pedestrian states for the respective pedestrians;
generating one or more models for one or more of the pedestrians based on one or more features of the environment, wherein a model of one or more of the models is indicative of one or more estimated goals of a corresponding pedestrian indicative of a desired destination for the corresponding pedestrian and one or more predicted paths for the corresponding pedestrian, wherein the model is generated based on one or more of the observed pedestrian states;
determining two or more pedestrian path predictions for one or more of the pedestrians based on two or more corresponding predicted paths, wherein a pedestrian path prediction of one or more of the pedestrian path predictions is indicative of a probability that the corresponding pedestrian will travel a corresponding predicted path;
rendering two or more of the pedestrian path predictions for two or more of the predicted paths, the rendering including a birds-eye-view of the environment, wherein each of the pedestrian path predictions is rendered to have a length associated with the probability that the corresponding pedestrian will travel on the corresponding predicted path; and
updating the rendering based on additional observed pedestrian states.

12. The method of claim 11, comprising gathering one or more observations from one or more of the pedestrians.

13. The method of claim 12, comprising inferring one or more of the estimated goals for one or more of the models based on one or more of the observations.

14. The method of claim 11, comprising generating one or more models for one or more of the pedestrians based on a Markov Decision Process (MDP).

15. The method of claim 11, comprising generating one or more models for one or more of the pedestrians based on one or more pedestrian navigation preferences.

16. The method of claim 11, comprising generating one or more models for one or more of the pedestrians based on one or more traffic rules.

17. The method of claim 11, comprising generating one or more models for one or more of the pedestrians based on a status of a feature of one or more of the features of the environment.

18. The method of claim 11, comprising generating one or more risk scores associated with one or more of the pedestrians indicative of a risk a vehicle equipped with the system for pedestrian path predictions poses an associated pedestrian or vice versa.

19. The method of claim 18, comprising rendering one or more of the risk scores.

20. A system for pedestrian path predictions, comprising:
a sensor component identifying an environment, one or more features of the environment, and one or more pedestrians within the environment, wherein the sensor component observes one or more pedestrian states for the respective pedestrians;
a modeling component generating one or more models for one or more of the pedestrians based on a Markov Decision Process (MDP), wherein a model of one or more of the models is indicative of one or more estimated goals of a corresponding pedestrian indicative of a desired destination for the corresponding pedestrian and one or more predicted paths for the corresponding pedestrian, wherein the model is generated based on one or more of the observed pedestrian states;
a prediction component determining two or more pedestrian path predictions for one or more of the pedestrians based on two or more corresponding predicted paths, wherein a pedestrian path prediction of one or more of the pedestrian path predictions is indicative of a probability that the corresponding pedestrian will travel a corresponding predicted path; and
an interface component rendering two or more of the pedestrian path predictions for two or more of the predicted paths, the rendering including a birds-eye-view of the environment, wherein each of the pedestrian path predictions is rendered to have a length associated with the probability that the corresponding pedestrian will travel on the corresponding predicted path, and wherein the interface component updates the rendering based on additional observed pedestrian states.

* * * * *